United States Patent
Lipski et al.

(10) Patent No.: US 12,062,211 B1
(45) Date of Patent: Aug. 13, 2024

(54) ENHANCED CONTENT POSITIONING

(71) Applicant: Apple Inc., Cupertino, CA (US)

(72) Inventors: Christian Lipski, Cupertino, CA (US); David A. McLaren, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/114,203

(22) Filed: Feb. 24, 2023

Related U.S. Application Data (63) Continuation of application No. 17/308,197, filed on May 5, 2021, now Pat. No. 11,625,857.

(60) Provisional application No. 63/038,990, filed on Jun. 15, 2020.

(51) Int. Cl.
*G06T 7/73* (2017.01)
*G06T 5/80* (2024.01)
*G06T 11/00* (2006.01)

(52) U.S. Cl.
CPC ............... *G06T 7/75* (2017.01); *G06T 5/80* (2024.01); *G06T 11/00* (2013.01)

(58) Field of Classification Search
CPC ............ G06T 7/75; G06T 5/006; G06T 11/00
See application file for complete search history.

(56) References Cited

U.S. PATENT DOCUMENTS

| | | | |
|---|---|---|---|
| 9,286,810 B2 | 3/2016 | Eade et al. | |
| 9,495,801 B2 | 11/2016 | Ebstyne et al. | |
| 9,529,426 B2 | 12/2016 | Liu et al. | |
| 2013/0201291 A1* | 8/2013 | Liu | G06F 3/012 348/47 |
| 2014/0300637 A1* | 10/2014 | Fan | G06T 7/75 382/100 |

OTHER PUBLICATIONS

Wetzstein, Gordon, "EE 267 Virtual Reality, Course Notes: 6-DOF Pose Tracking with the VRduino"; Nov. 2, 2017; pp. 1-17.

* cited by examiner

*Primary Examiner* — Shivang I Patel
(74) *Attorney, Agent, or Firm* — Thompson Hine LLP (57) ABSTRACT

Various implementations disclosed herein include devices, systems, and methods that tracks an electronic device by fusing tracking algorithms. In some implementations, instructions stored on a computer-readable medium are executable to cause obtaining pairs of first position data corresponding to a position of the electronic device in a first coordinate system obtained using a first technique and second position data in a second coordinate system obtained using a second technique. In some implementations, transformations for the respective pairs are determined that provide a positional relationship between the first coordinate system and the second coordinate system. In some implementations, a subset of the pairs is identified based on the transformations, and a combined transformation is determined based on the subset of the transformations. In some implementations, content is provided on an electronic device based on the combined transformation. In some implementations, an update to the combined transformation is gradually applied.

20 Claims, 6 Drawing Sheets

ENHANCED CONTENT POSITIONING

CROSS-REFERENCE TO RELATED APPLICATION

This patent is a continuation of U.S. Application Ser. No. 17/308,197 filed May 5, 2021, which claims the benefit of U.S. Provisional Application Ser. No. 63/038,990 filed Jun. 15, 2020. U.S. application Ser. No. 17/308,197 and U.S. Provisional Application Ser. No. 63/038,990 are hereby incorporated by reference herein in their entireties.

TECHNICAL FIELD

The present disclosure generally relates to systems, methods, and devices that present augmentations and other virtual content based on the position of an electronic device relative to the device's physical environment.

BACKGROUND

Various techniques are used to provide augmentations and other virtual content on electronic devices. Existing techniques may not accurately and efficiently position such virtual content relative to other content, such as other content corresponding to the physical environment in which the electronic device is being used.

SUMMARY

Various implementations disclosed herein include devices, systems, and methods that track an electronic device location. Accurately tracking an electronic device position relative to the device's physical environment (e.g., a 3D model of the device's physical environment) may facilitate accurate positioning of virtual content. For example, virtual content may be defined at positions relative to a 3D model of a physical environment. Techniques disclosed herein accurately track the electronic device's position relative to that 3D model of the physical environment over time. This enables, among other things, presentation of live views of the physical environment at the electronic device with accurately-positioned augmentations. In some implementations, techniques disclosed herein accurately track an electronic device relative to a 3D model of a physical environment to enable accurately positioning of virtual content that is defined with respect to that 3D model. For example, augmentations may be positioned with respect to video pass through or optical-see through views of the physical environment provided by the electronic device. In some implementations, the electronic device presents an extended reality (XR) environment with virtual content positioned based on the electronic device location.

Various implementations disclosed herein include devices, systems, and methods that determine an electronic device position (e.g., latitude, longitude, altitude or coordinates in a 3D model of a physical environment) by combining position data generated by different tracking techniques or from different sources/sensors. In some implementations, a first technique (e.g., Visual Localization (VL)) uses image/depth sensor data to locate the device relative to a 3D model of an environment while a second technique (e.g., Visual Inertial Odometry (VIO)) uses motion sensors to track changes in device position over time in a local environment. In some implementations, a transformation defines the relationship between the 3D coordinate systems used by the different techniques. In some implementations, the transformation could be revised each time the first technique provides new information or a new localization for the electronic device (e.g., at each new localization event). In some implementations, the transformation is determined by combining (e.g., averaging) information from localization events (e.g., a subset of all localization events) that are relatively consistent between the two techniques. In some implementations, an accuracy or consistency of the electronic device position improves over time.

In some implementations, at an electronic device having a processor, a method includes obtaining pairs of first position data and second position data, the first position data corresponding to a position of the electronic device in a first coordinate system obtained using a first technique and the second position data corresponding to a position of the electronic device in a second coordinate system obtained using a second technique. In some implementations, transformations for the pairs are determined, wherein each of the pairs is associated with a transformation that defines a positional relationship between the first coordinate system and the second coordinate system based on the first position data and the second position data of the respective pair. Then, a subset of the pairs is identified based on the transformations, a subset of the transformations corresponding to the subset of the pairs, and a combined transformation is determined based on the subset of the transformations. In some implementations, content is provided on the electronic device based on the combined transformation.

In some implementations, at an electronic device having a processor, a method includes presenting content on the electronic device based on a current transformation that defines a current positional relationship between a first coordinate system and a second coordinate system. In some implementations, an updated transformation is obtained that defines an updated positional relationship between the first coordinate system and the second coordinate system. Then, a transformation correction is determined based on the updated transformation and the current transformation, a portion of the transformation correction is applied based on movement of the electronic device, wherein the portion is less than all of the transformation correction.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice, the various features illustrated in the drawings may not be drawn to scale.

Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
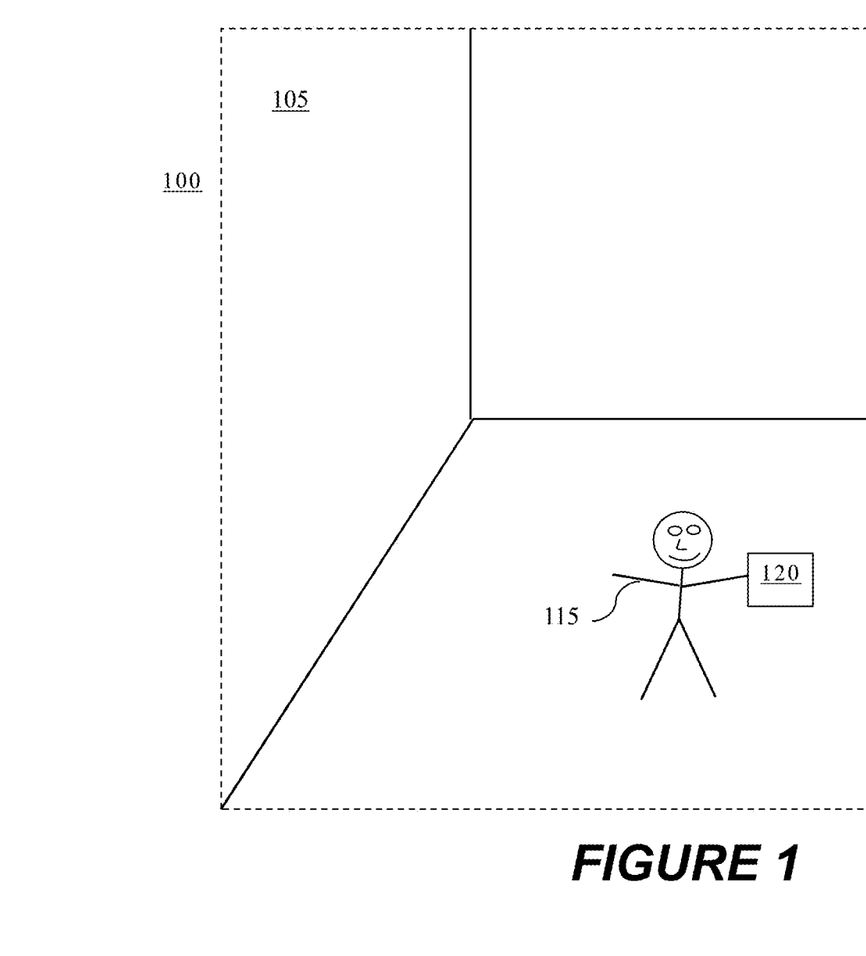
FIG. 1 is a diagram of an example operating environment in accordance with some implementations.

FIG. 1 illustrates an example operating environment 100 in which electronic device 120 is used in physical environment 105. A physical environment refers to a physical world that people can interact with and/or sense without the aid of electronic systems. Physical environments, such as a physical park, include physical articles, such as physical trees, physical buildings, and physical people. People can directly sense and/or interact with the physical environment, such as through sight, touch, hearing, taste, and smell.

In the example of FIG. 1, the device 120 is illustrated as a single device. Some implementations of the device 120 are hand-held. For example, the device 120 may be a mobile phone, a tablet, a laptop, and so forth. In some implementations, the device 120 is worn by a user. For example, the device 120 may be a watch, a head-mounted device (HMD), and so forth. In some implementations, functions of the device 120 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of the device 120 may communicate with one another via wired or wireless communications.

In some implementations, the device 120 is configured to manage and coordinate an XR environment for the user 115. In some implementations, virtual content added to the XR environment is positioned based on a position (e.g., pose) of the device. In some implementations, the device 120 includes a suitable combination of software, firmware, or hardware. In some implementations, the device 120 is a computing device that is local or remote relative to the physical environment 105.

According to some implementations, the electronic device 120 presents an XR environment to the user 115 while the user 115 is present within the physical environment 105. An extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to characteristic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
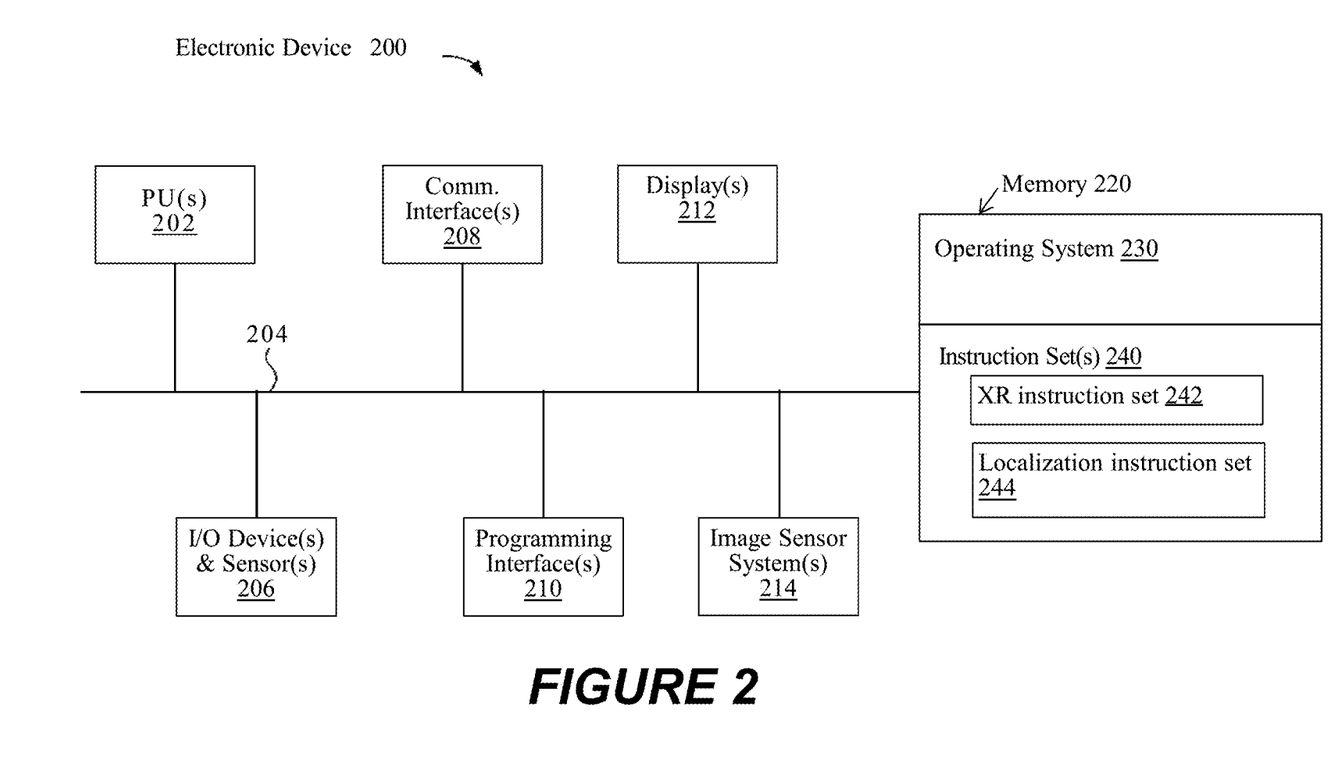
FIG. 2 is a diagram of an example electronic device in accordance with some implementations.

FIG. 2 is a block diagram of an example device 200. Device 200 illustrates an exemplary device configuration for the device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 200 includes one or more processing units 202 (e.g., microprocessors, ASICs, FPGAs, GPUs, CPUs, processing cores, or the like), one or more input/output (I/O) devices and sensors 206, one or more communication interfaces 208 (e.g., USB, FIRE-WIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 210, one or more displays 212, one or more interior or exterior facing sensor systems 214, a memory 220, and one or more communication buses 204 for interconnecting these and various other components.

In some implementations, the one or more communication buses 204 include circuitry that interconnects and controls communications between system components. In some implementations, the one or more I/O devices and sensors 206 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 212 are configured to present content to the user. In some implementations, the one or more displays 212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 212 correspond to diffractive, reflective, polarized, holographic, etc. waveguide displays. For example, the electronic device 200 may include a single display. In another example, the electronic device 200 includes a display for each eye of the user.

In some implementations, the one or more interior or exterior facing sensor systems 214 include an image capture device or array that captures image data or an audio capture device or array (e.g., microphone) that captures audio data. The one or more image sensor systems 214 may include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 214 further include an illumination source that emits light such as a flash. In some implementations, the one or more image sensor systems 214 further include an on-camera image signal processor (ISP) configured to execute a plurality of processing operations on the image data.

The memory 220 includes high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium.

In some implementations, the memory 220 or the non-transitory computer readable storage medium of the memory 220 stores an optional operating system 230 and one or more instruction set(s) 240. The operating system 230 includes procedures for handling various basic system services and for performing hardware dependent tasks. In some implementations, the instruction set(s) 240 include executable software defined by binary information stored in the form of electrical charge. In some implementations, the instruction set(s) 240 are software that is executable by the one or more processing units 202 to carry out one or more of the techniques described herein.

In some implementations, the instruction set(s) 240 include an XR instruction set 242 that is executable by the processing unit(s) 202 to create, edit, present, or experience XR environments and a localization instruction set 244 that is executable to track an electronic device position relative to the device's physical environment (e.g., a 3D model of the device's physical environment), which may facilitate positioning of virtual content. The XR instruction set 242 is configured to present virtual content that will be used as part of XR environments for one or more users. For example, the user may view and otherwise experience a XR-based user interface that allows the user to select, place, move, and otherwise present a XR environment, for example, based on the virtual content position via hand gestures, voice commands, input device inputs, etc.

Although the instruction set(s) 240 are shown as residing on a single device, it should be understood that in other implementations, any combination of the elements may be located in separate computing devices. FIG. 2 is intended more as a functional description of the various features which are present in a particular implementation as opposed to a structural schematic of the implementations described herein. As recognized by those of ordinary skill in the art, items shown separately could be combined and some items could be separated. For example, an actual number of instruction sets and the division of particular functions and how features are allocated among them will vary from one implementation to another and, in some implementations, depends in part on the particular combination of hardware, software, or firmware chosen for a particular implementation.

Various implementations disclosed herein include devices, systems, and methods that determine an electronic device position (e.g., latitude, longitude, altitude) by combining position data. In some implementations, the position of the electronic device fuses position data generated by different tracking techniques or from different sources/sensors. In some implementations, a first technique (e.g., Visual Localization (VL)) uses image/depth sensor data to locate the device relative to a 3D model of an environment while a second technique (e.g., VIO) uses motion sensors to track changes in device position over time in a local environment. In some implementations, a transformation defines the relationship between the 3D coordinate systems used by the different techniques. In some implementations, the transformation could be revised each time the first technique provides new information or a new localization for the electronic device (e.g., at each new localization event). In some implementations, the transformation is determined by combining (e.g., averaging) information from localization events (e.g., a subset of all localization events) that are relatively consistent between the two techniques. In some implementations, the position of the electronic device is used to present XR environments generated at the electronic device.

In some implementations, the first tracking technique uses a 3D representation of the physical environment. In some implementations, the first tracking technique uses only a select portion of such a 3D representation. For example, the electronic device may access or download a portion of the 3D representation based on an initial position of the electronic device, e.g., the electronic device may download only the portion of the 3D representation that is viewable from the initial position of the electronic device. The amount of the 3D representation that is accessed or downloaded may depend upon a degree of confidence of that initial geographic location, e.g., downloading more of the surrounding viewable portions of the 3D representation when there is relatively less confidence in the initial geographic position. In some implementations, the 3D representation provides a 3D representation of an entire neighborhood, town, city, state, country, continent, or even the entire surface layer of the earth. In some implementations, the 3D representation is generated based on satellite imagery, ground-based, vehicle-based, or aerial photography, and/or geographic information system data (e.g., GPS data).

In some implementations, the 3D representation of the physical environment is generated from a data set captured from multiple sensors including image sensors, depth sensors, LiDAR, GPS sensors, etc. In some implementations, the 3D representation of the physical environment is generated from the data set that is generated by mounting the multiple sensors to a car (e.g., bike or person) that drives along streets, roads, highways, etc. capturing 360° representations of the geographic locations. In some implementations, the data from the multiple sensors is merged to form a highly accurate representation of the physical environment, e.g., a dense 3D point cloud of points having descriptors. The 3D representation of the physical environment may be used to generate a smaller representation of the physical environment for a given geographic location. The data may be very dense. For example, a view from a given position may include millions or billions of data points. An entire city may include 100 terabytes or more.

Accordingly, in some implementations, depending on the initial position of the electronic device, a portion of the 3D representation of the physical environment is downloaded to the electronic device. In some implementations, a 15 m×15 m portion of the 3D representation of the physical environment is downloaded to the electronic device. In some implementations, the downloaded portion can be 2 Mb to 500 Kb to represent a 15×15 m portion. When the confidence of the initial position of the electronic device is greater, an even smaller portion (e.g., 10 m×15 m, 8 m×10 m) of the 3D representation of the physical environment is downloaded.

In some implementations, the downloaded portion of the 3D representation of the physical environment contains all points in the 15 m×15 m area and all points outside that 15 m×15 m area that are visible from the 15 m×15 m area. For example. a tall building three blocks away that is visible from the downloaded area would be included.

In some implementations, the VL provides a localization for the electronic device by matching image data from an image sensor (e.g., camera) on the electric device against the downloaded 3D representation of the physical environment. In some implementations, the VL determines the position (e.g., position (x, y, z) and orientation (rotation about the x axis, y axis, z axis)) of the electronic device by matching sensor data (e.g., image data, depth data, etc.) from the electronic device.

In some implementations, because of processing capabilities (e.g., runtime and computation requirement restrictions) at the electronic device, VL provides an updated localization for the electronic device at a reduced frequency. For example, VL may update the position of the electronic device at a rate of 0.2 Hz, 0.5 Hz, or 2 Hz. In some implementations, a median error of VL is around 0.2-2.0 m. For example, when a median error of VL is around 0.6 m, the position of the electronic device may move or "jump" more than a meter when a new VL localization for the electronic device is obtained. In some implementations, a small percentage of VL localization may be off by more than 10 m.

In some implementations, a second tracking technique (e.g., VIO) is used to bridge the time intervals between VL localizations for the electronic device. For example, a second tracking technique may obtain more frequent position estimates and thus may provide position information during the interval between localizations events provided by the first tracking technique. Combining information from both tracking techniques may thus provide more frequent localization of the electronic device, as well as provide a means of ensuring the combined localization obtained based on both techniques is stable with respect to outlier and otherwise inaccurate localization events.

In some implementations, the second tracking technique uses a VIO system to track the position of the electronic device in the physical environment. In some implementations, VIO tracks the position the electronic device position in the physical environment (e.g., the 6 DOF position) in real-time. In some implementations, VIO recalculates or updates the position of the electronic device position in the physical environment in-between every frame refresh on a display of the electronic device. For example, VIO recalculates the position of the electronic device position in the physical environment 10, 30, or 60 or more times a second. In some implementations, VIO tracks the position using a visual sensor (e.g., camera system) by matching a point in the real world to a pixel on the image sensor in each frame and using an inertial system (e.g., accelerometer and gyroscope, inertial measurement unit (IMU), etc.). In some implementations, VIO tracks the distance that the electronic device traveled in the physical environment. In some implementations, VIO tracks 6 DOF movement in the physical environment (e.g., 3 DOF of spatial (xyz) motion (translation), and 3 DOF of angular (pitch/yaw/roll) motion (rotation). In some implementations, VIO is implemented by a software development kit providing an augmented reality (AR) development platform for electronic devices. In some implementations, VIO uses simultaneous localization and mapping (SLAM) technique for estimating motion using one or more cameras and one or more IMUs to track and update a map for a physical environment.

In some implementations, the combined position of the electronic device is obtained by combining the position reported by VL and VIO, respectively. In some implementations, at each localization event, a pair of a VL position (global coordinate system) and a VIO position (local coordinate system) is obtained. In some implementations, pairs of VL poses and VIO poses are stored. In some implementations, the last 20 pairs of VIO local poses and VL global poses that were computed on the same camera image are stored. In some implementations, the pairs of VIO local poses and VL global poses form a sliding window of a preset number (e.g., 10, 20, 30) of the most recent pairs. In some implementations, localization events to fill the sliding window of 20 pairs of VIO local poses and VL global poses may result less than 20 pairs (e.g., 5 pairs) to evaluate based on conditions in the physical environment.

For each pair, a transformation is determined that defines a positional relationship between the VL position and VIO position. In some implementations for each pair, a transformation is determined that defines a positional relationship between the VL position (global coordinate system) and the VIO position (local coordinate system) based on the same image data. In some implementations for each pair, a transformation is determined that defines a positional relationship between the VL position and VIO position using the same frame(s) or image(s). In some implementations, the transformations for the pairs are a 4 DOF transformation. In some implementations, the transformations are latitude, longitude, altitude (or X, Y, and Z) position transformations and a rotation transformation about a vertical axis (e.g., the z axis).

For the stored pairs, each pair is respectively compared to the remaining stored pairs by comparing the respective transformations. In some implementations, the transformations of the remaining pairs that differ by less than a threshold difference (e.g., a spatial and rotational threshold) from the current pair is considered consistent with the current pair. After all stored pairs are evaluated, the pair with most consistent other pairs is selected. The selected pair and its consistent pairs are considered inlier pairs. In some implementations, there must be minimum number of inlier pairs (e.g., 2, 4, 6), otherwise the electronic device is not localized, and the process stops until more localization events (e.g., pairs of VL and VIO poses received at the VL update rate) are received. When the electronic device is localized, then the inlier pairs are used to determine a combined transformation with four DOF that is used to transform between global system coordinates and local system coordinates. In some implementations, a current combined transformation is valid until the next VL localization event. In some implementations, the 4 DOF combined transformation is computed by first determining the relative yaw (e.g., average rotation around the vertical-axis) between the VIO and VL poses for the inlier pairs. Then, the relative yaw is applied to VIO poses of the inlier pairs to get modified VIO poses, and the relative translation e.g., average along x, y, z; latitude, longitude, altitude; etc.) is computed from the modified VIO poses to VL poses of the inlier pairs. In some implementations, the relative yaw and translation determine a current combined transformation with 4 DOF that is used to transform between global system coordinates and local system coordinates (e.g., from VL to VIO 3D coordinates or from VIO to VL 3D coordinates).

Figure 3:
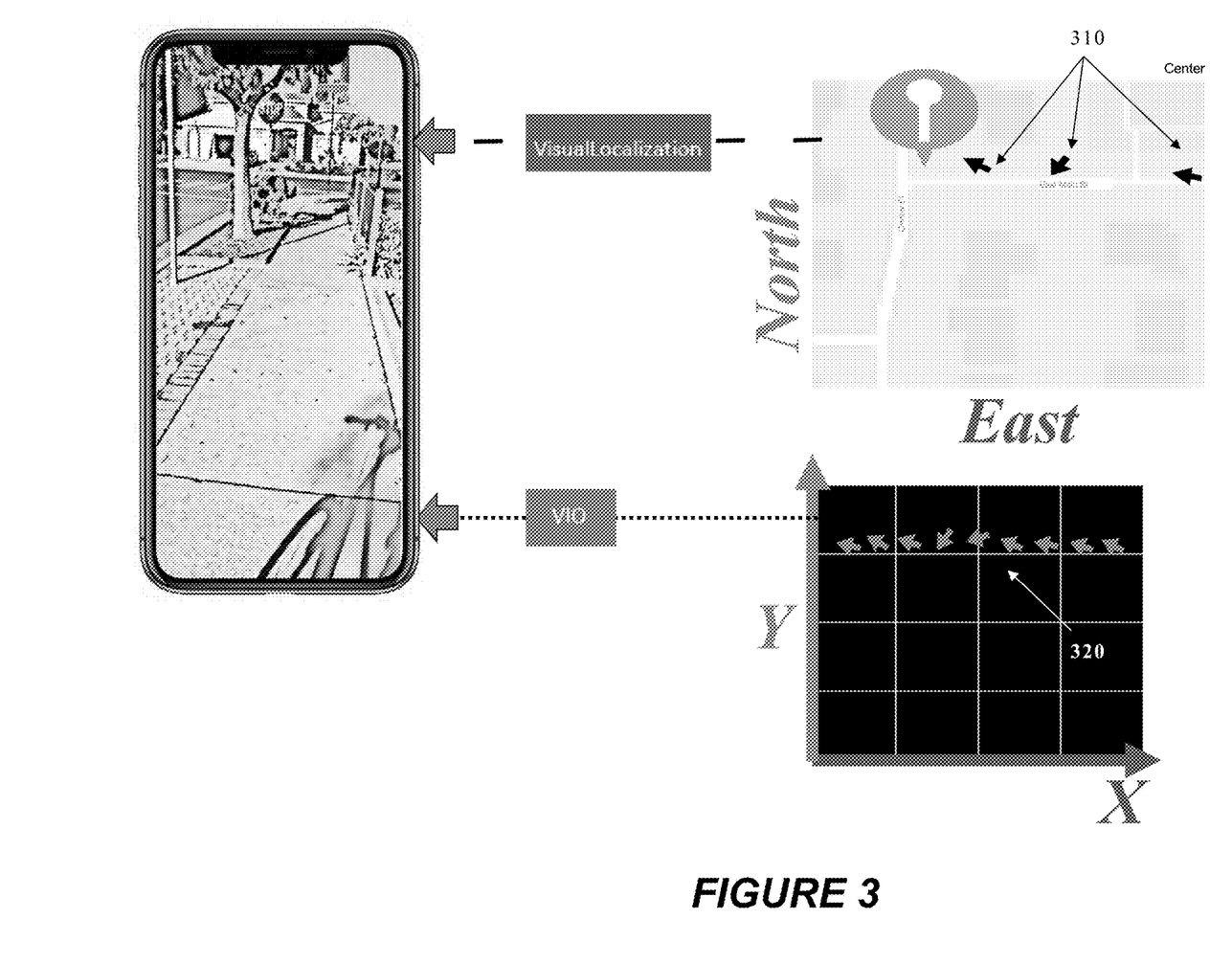
FIG. 3 is a diagram illustrating an exemplary localization in accordance with some implementations.

FIG. 3 is a diagram that illustrates exemplary localization events for an electronic device in accordance with some implementations. As shown in FIG. 3, arrows 310 are VL global camera poses, and arrows 320 are VIO camera poses.

In some implementations, minor "jumps" in the position of the electronic device may still occur when updated with the combined transformation. In some implementations, minor "jumps" after updating with the combined transformation are noticeable when the electronic device is stationary, moving very slow, or a user is interacting zoomed-in or up-close with virtual content in an XR environment. In some implementations, a minor "jump" of 10 cm or 20 cm is noticeable to the user of the electronic device. Accordingly, in some implementations, the combined transformation may not be not immediately applied of fully applied to the position of the electronic device.

In some implementations, a current combined transformation is being used at the electronic device to transform between VL global coordinates and VIO local coordinates, when an updated combined transformation is obtained. In some implementations, the updated combined transformation is not immediately applied to the position of the electronic device because a "correction budget" is determined. In some implementations, the correction budget is based on the current velocity of the electronic device (e.g., the more the electronic device is moving, the larger the correction becomes). For example, the translation correction budget may be 1 cm for every 10 cm translation of the electronic device. In another example, the rotation correction budget may be 1 degree for every 10 degrees of rotation of the electronic device. In some implementations, the correction budget (e.g., translation and rotation) is applied to position of the electronic device until the position is identical to the updated combined transformation or another updated combined transformation is received. For example, if the updated combined transformation is a 1 m adjustment east and the user is moving 40 cm/minute north, a correction budget is 4 cm applied to each frame at a 60 Hz refresh rate for the display. In this case 1 m would be corrected over 25 frames (e.g., 1 m=100 cm/4 cm=25) or in less than a half a second (e.g., 25 frames/60 fps=5/12 second). In some implementations, the correction budget is applied to each updated frame at the update rate of the VIO system (e.g., 60 Hz). In some implementations, the correction budget is applied to intermittent frames (e.g., every other frame or every $5^{th}$ frame) locally updated by the VIO system. In some implementations, the updated combined transformation implemented at the electronic device by the correction budget is not noticeable to or seen by the user of the electronic device.

In some implementations, when the updated combined transformation and the current combined transformation diverge by more than a translation threshold (e.g., 1 meter) or a rotation threshold (e.g., 20 degrees), an additional secondary correction budget is implemented on top of the correction budget. In some implementations, the additional secondary correction budget reduces effects of or reduces a length of time for incorrect localizations.

In some implementations, virtual content added to the XR environment is positioned based on a 3D geographic location. In some implementations, the electronic device is used to present a XR environment to a user of the electronic device. In some implementations, virtual content added to the XR environment is positioned based on the electronic device location.

Figure 4:
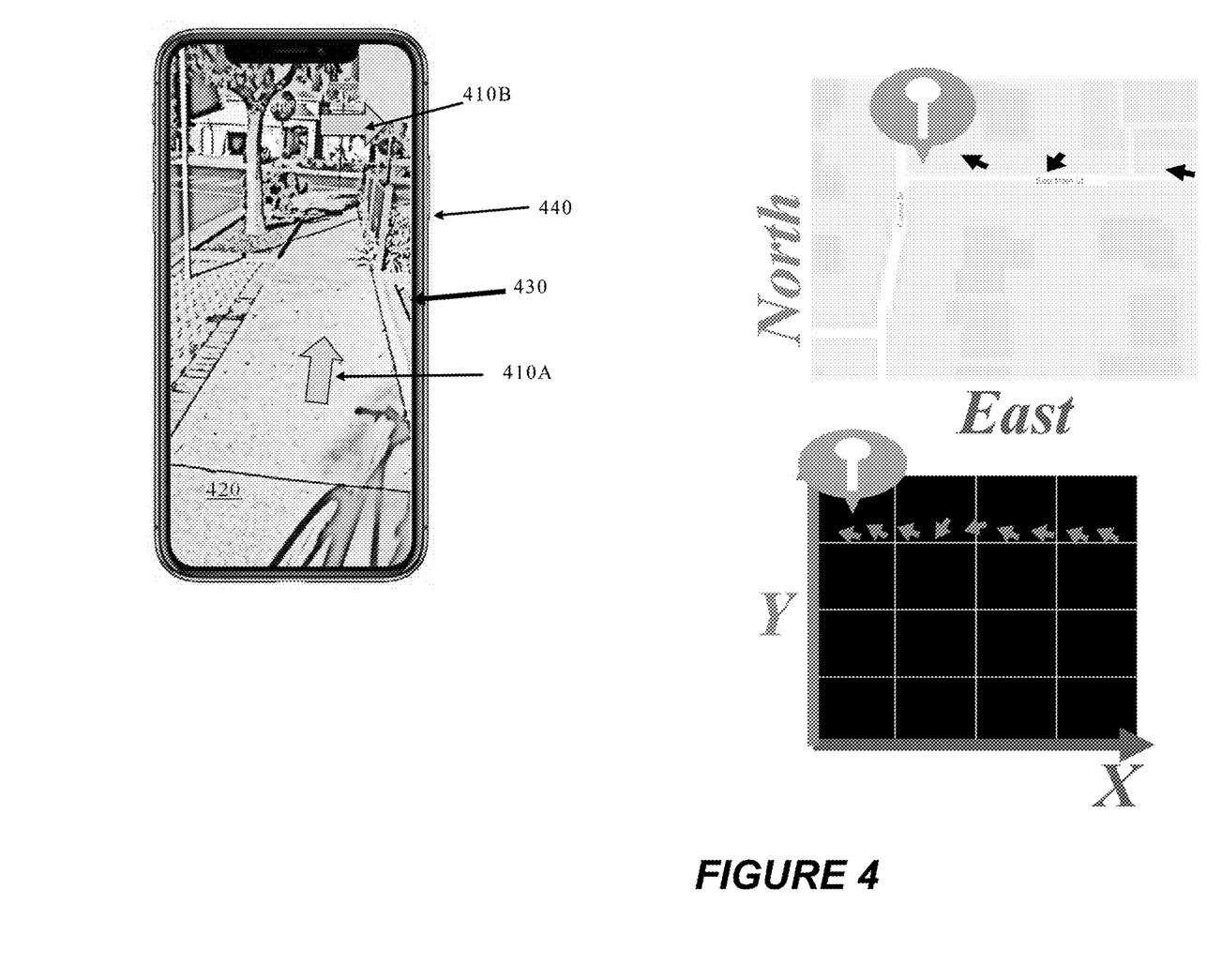
FIG. 4 is a diagram illustrating exemplary virtual content added to a view of a physical environment in accordance with some implementations.

FIG. 4 is a diagram showing virtual content added to an XR environment based on a geographic position of the electronic device. As shown in FIG. 4 virtual content arrows 410A and 410B be are added to an XR environment 420 provided in a display 430 of an electronic device 440. As shown in FIG. 4, a navigation app has added arrows 410A and 410B (e.g., based on a position of the electronic device 440) to show the path ((e.g., directions) to a desired goal. The navigation app is providing instructions for the user to turn right at the next street.

Figure 5:
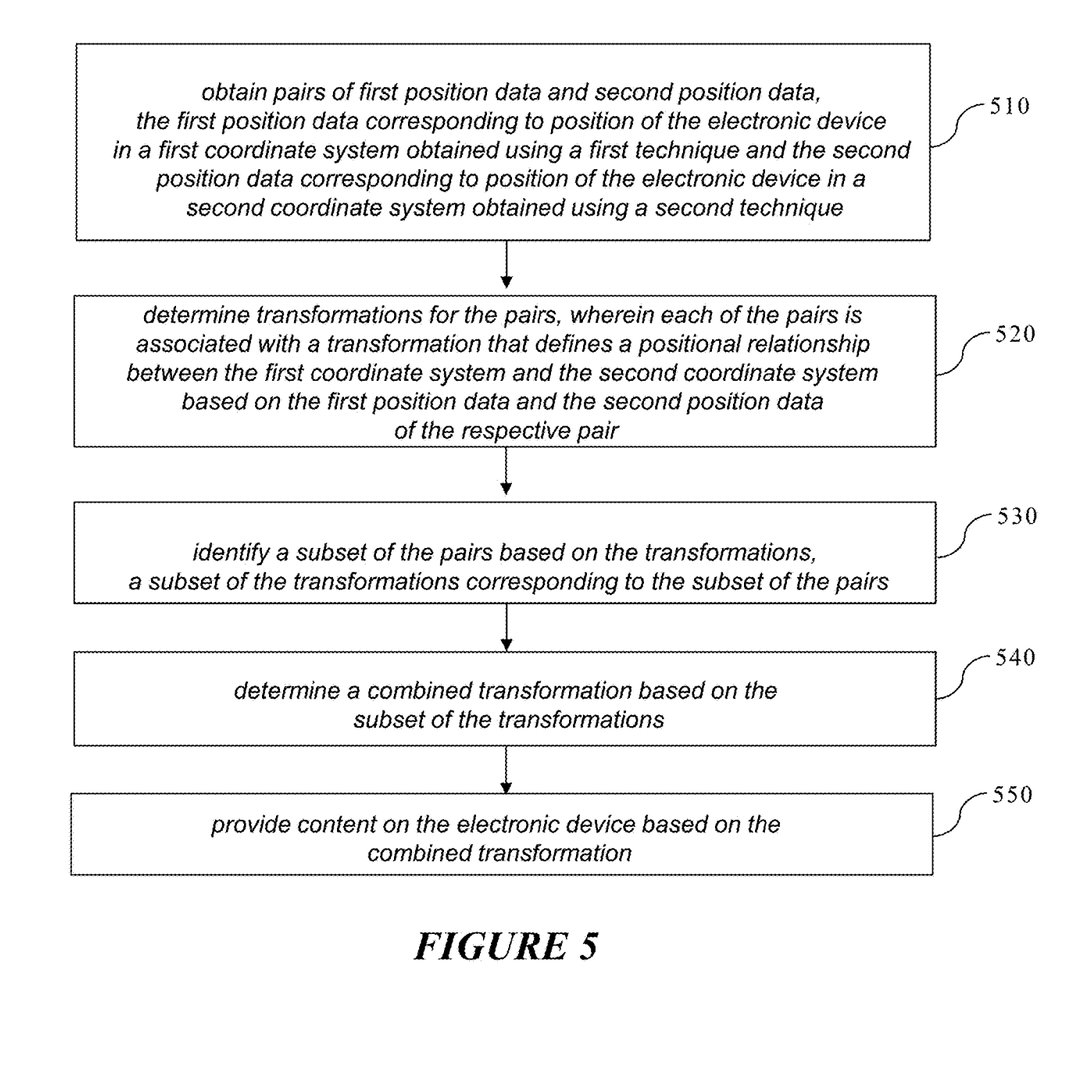
FIG. 5 is a flowchart illustrating an exemplary method of determining the position of an electronic device in accordance with some implementations.

FIG. 5 is a flowchart illustrating an exemplary method of determining the position of an electronic device using two techniques in accordance with some implementations. In some implementations, a first technique (e.g., Visual Localization (VL)) uses image/depth sensor data to locate the electronic device relative to a 3D model of an environment while a second technique (e.g., VIO) simultaneously uses motion sensors to track changes in the electronic device position over time. In some implementations, a transformation defines the relationship between the coordinate systems used by the different techniques. In some implementations, the transformation could be revised each time the first technique provides new information (e.g., at each new localization event). In some implementations, the transformation is determined by averaging information from only localization events that are relatively consistent between the two techniques. In some implementations, the method 500 is performed by a device (e.g., electronic device 120, 200 of FIGS. 1-2). The method 500 can be performed using an electronic device or by multiple electronic devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 510, the method 500 obtains pairs of first position data and second position data, the first position data corresponding to a position of the electronic device in a first coordinate system obtained using a first technique and the second position data corresponding to position of the electronic device in a second coordinate system obtained using a second technique. In some implementations, the first technique uses an image or depth sensor data to locate the electronic device relative to a 3D model of a physical environment (e.g., Visual Localization (VL) technique). In some implementations, the second technique is based on a visual data and inertial data 3D model of the physical environment in a local coordinate system (e.g., Visual Inertial Odometry (VIO) technique). In some implementations, the pairs of first position data and second position data may form a sliding window of a fixed number of pairs of VL-based device poses in a global coordinate system and VIO-based device poses in a local coordinate system. In some implementations, the position data produced by the different techniques have different data update rates.

At block 520, the method 500 determines transformations for the pairs, wherein each of the pairs is associated with a transformation that defines a positional relationship (e.g., pose) between the first coordinate system and the second coordinate system based on the first position data and the second position data of the respective pair. In some implementations, the transformations may account for drift in the second position data. In some implementations, the transformations are a 4DOF transformation. In some implementations, the transformations include X, Y, and Z position transformations and a rotation transformation about a vertical axis At block 530, the method 500 identifies a subset of the pairs based on the transformations, a subset of the transformations corresponding to the subset of the pairs. In some implementations, identifying the subset of the pairs includes identifying the subset of the transformations that differ by less than a threshold difference (e.g., a spatial and rotational threshold). In some implementations, identifying the subset of pairs compares a relative transformation of a first pair of first position data and second position data with all other pairs to determine whether the other pairs have relative transformations that are consistent with (e.g., within a threshold difference of) the relative transformation of the first pair. In some implementations, the pairs that are consistent with the first pair and the first pair are considered inlier pairs. In some implementations, the single pair with the highest number of consistent other pairs forms the subset of pairs (e.g., inlier pairs).

At block 540, the method 500 determines a combined transformation based on the subset of the transformations. In some implementations, determining the combined transformations includes combining the transformations of the subset of pairs. In some implementations, determining the combined transformations includes combining the 4 DOF transformations of the subset of pairs (e.g., rotation about vertical axis and x, y, z). In some implementations, determining the combined transformation based on the subset of the transformations includes averaging of the subset of the transformations corresponding to the subset of pairs. In some implementations, determining the combined transformation based on the subset of the transformations includes weighted averaging of the subset of the transformations corresponding to the subset of pairs.

At block 550, the method 500 provides content on the electronic device based on the combined transformation. In some implementations, providing content includes presenting virtual content based on the combined transformation. For example, augmented content's position may be defined relative to the first global coordinate system (e.g., relative to a 3D model used by the first technique) and may be presented on the electronic device based on the local coordinate system (used by VIO) and the combined transformation. In some implementations, the combined transformation may be redetermined as each new pair of position data is received.

In some implementations at block 510, the method 500 obtains pairs of first position data and second position data based on image(s) of the physical environment captured by an image sensor at the electronic device. In some implementations, the image sensor can be a RGB camera, a depth sensor, a RGB-D camera, monochrome cameras, one or more 2D cameras, event cameras, IR cameras, or the like. In some implementations, combinations of sensors are used. In some implementations, one or more sensors are used to generate an XR environment representing the physical environment at the electronic device. In some implementations, color images can be used. Alternatively, in some implementations, grayscale images can be used.

Figure 6:
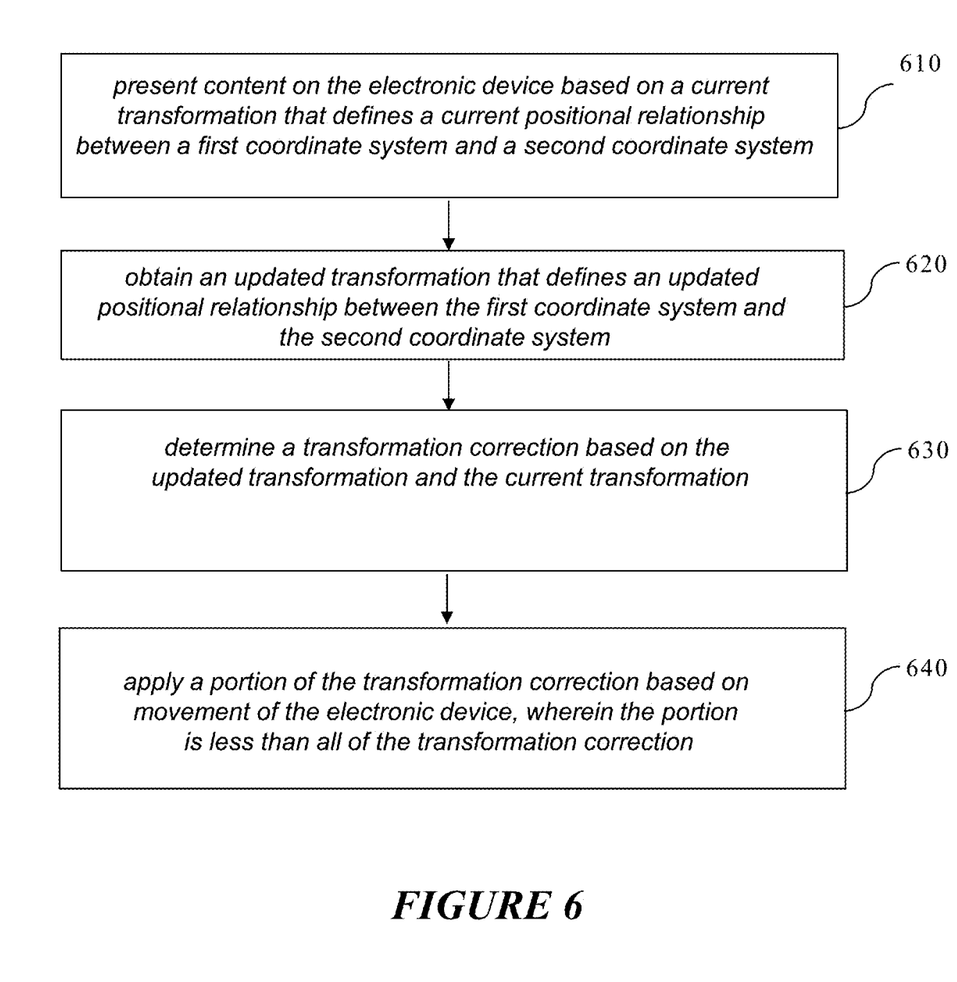
FIG. 6 is a flowchart illustrating an exemplary method of determining the position of an electronic device in accordance with some implementations.

FIG. 6 is a flowchart illustrating an exemplary method of determining the position of a device using two different techniques in accordance with some implementations. In some implementations, a transformation defines the relationship between the coordinate systems used by the different techniques. In some implementations, the transformation is applied gradually over multiple frames based on movement of the electronic device. In some implementations, the transformation could be revised each time one technique provides new information (e.g., at each new localization event). In some implementations, the transformation is determined using information from only localization events (e.g., inlier pairs) that are relatively consistent between the two techniques. In some implementations, a first technique (e.g., VL) uses image/depth sensor data to locate the device relative to a 3D model of an environment while a second technique (e.g., VIO) uses motion sensors to track changes in device position over time. In some implementations, the method 600 is performed by a device (e.g., electronic device 120, 200 of FIGS. 1-2). The method 600 can be performed using an electronic device or by multiple devices in communication with one another. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 presents content on an electronic device based on a current transformation that defines a current positional relationship between a first coordinate system and a second coordinate system. In some implementations, the first coordinate system is obtained using a first technique and the second coordinate system is obtained using a second technique. In some implementations, the first technique uses image or depth sensor data to locate the electronic device relative to a 3D model of a physical environment in a global coordinate system (e.g., VL). In some implementations, the second technique uses visual data and inertial data to locate the electronic device relative to a visual data inertial 3D model of the physical environment in a local coordinate system (e.g., VIO).

In some implementations, pairs of first position data and second position data are obtained, the first position data corresponding to the position of the electronic device in the first coordinate system and the second position data corresponding to the position of the electronic device in the second coordinate system. In some implementations, the position data produced by the different techniques have different data update rates. In some implementations, the current transformation defines the current positional relationship by comparing a first position determined based on matching image data with a 3D representation of a physical environment (VL) and with a second position determined based on image and/or sensor data (e.g., VIO).

At block 620, the method 600 obtains an updated transformation that defines an updated positional relationship between the first coordinate system and the second coordinate system. In some implementations, an updated pair of first position data and second position data are obtained, and used to determine the updated transformation that defines the updated positional relationship between the first coordinate system and the second coordinate system.

At block 630, the method 600 determines a transformation correction based on the updated transformation and the current transformation. In some implementations, the transformation correction is the difference between the updated transformation and the current transformation. In some implementations, the transformation correction, the updated transformation, and the current transformation are 4DOF transformations (e.g., x, y, z and rotation around a vertical axis).

At block 640, the method 600 applies a portion of the transformation correction based on movement of the electronic device, wherein the portion is less than all of the transformation correction. In some implementations, applying a portion of the transformation correction includes determining a correction budget based on movement (e.g., positional and rotation) of the electronic device and correcting only the portion of the correction corresponding to the correction budget in a current frame. In some implementations, the transformation correction is spread across multiple sequential frames displayed on the electronic device. In some implementations, the transformation correction is spread across multiple frames (e.g., intermittent or non-sequential frames) displayed on the electronic device.

In some implementations, determining the correction budget is based on a velocity of the electronic device. In some implementations, determining the correction budget is based on a rotation of the electronic device. In some implementations, the correction budget is applied to each of a plurality of subsequent frames of the electronic device. In some implementations, the correction budget is 10% of the transformation correction. In some implementations, the correction budget is 10% of the transformation correction and the correction budget is applied at VIO frame rate until complete (e.g., the updated transformation is being applied).

In some implementations, the transformation correction is compared to a threshold and a second correction is determined when the transformation correction of the electronic device is above the threshold. In some implementations, a portion of the second correction is combined with the portion of the transformation correction, wherein the portion of the second correction is less than all of the second correction. In some implementations, a portion of the second correction is a second correction budget that is combined with the correction budget and is applied at VIO frame rate until complete (e.g., the updated transformation is being applied). In some implementations, the threshold is 1 m translation (in x, y, z coordinates) or 10 degrees rotation around the vertical axis (yaw).

Various implementations disclosed herein include devices, systems, and methods that provide electronic device tracking including various features described herein (e.g., individually or in combination).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A non-transitory computer-readable storage medium storing program instructions executable via one or more processors to perform operations comprising:
    obtaining pairs of first position data and second position data, the first position data corresponding to position of an electronic device in a first coordinate system obtained using a first technique and the second position data corresponding to position of the electronic device in a second coordinate system obtained using a second technique;
    determining transformations for the pairs, wherein each of the pairs is associated with a transformation that defines a positional relationship between the first coordinate system and the second coordinate system based on the first position data and the second position data of a respective pair;
    identifying a subset of the pairs based on the transformations, a subset of the transformations corresponding to the subset of the pairs;
    determining a combined transformation based on the subset of the transformations; and
    providing content on the electronic device based on the combined transformation.

2. The computer-readable storage medium of claim 1, wherein the instructions are further executable to perform operations comprising:
    obtaining image data of a physical environment, wherein the first position data and the second position data are based on the image data of the physical environment.

3. The computer-readable storage medium of claim 1, wherein the first position data is based on a predetermined image and depth data of a physical environment.

4. The computer-readable storage medium of claim 1, wherein the second position data is based on a visual data and inertial data of a physical environment.

5. The computer-readable storage medium of claim 1, wherein the pairs comprise a set of a fixed number of most recent pairs of the first position data and the second position data, wherein the first position data is updated at a first rate and the second position data is updated at a second rate that is higher than the first rate.

6. The computer-readable storage medium of claim 1, wherein the transformations comprise a X, Y, and Z position transformation and a rotation transformation about a vertical axis.

7. The computer-readable storage medium of claim 1, wherein identifying the subset of the pairs based on the transformations comprises identifying the subset of the transformations that differ by less than a threshold difference.

8. The computer-readable storage medium of claim 1, wherein determining the combined transformation based on the subset of the transformations comprises a weighted averaging of the subset of the transformations.

9. The computer-readable storage medium of claim 1, wherein the instructions are further executable to perform operations comprising:
    providing virtual content at the electronic device, wherein a position of the virtual content is defined relative to the first coordinate system and the virtual content is presented on the electronic device based on the first coordinate system and the combined transformation or the position of the virtual content is defined relative to the second coordinate system and the virtual content is presented on the electronic device based on the second coordinate system and the combined transformation.

10. The computer-readable storage medium of claim 1, wherein the instructions are further executable to perform operations comprising:
    determining a transformation correction based on an updated transformation that defines an updated positional relationship between the first coordinate system and the second coordinate system; and
    applying a portion of the transformation correction based on movement of the electronic device, wherein the portion is less than all of the transformation correction.

11. An electronic device comprising:
one or more processors; and
memory storing instructions that, when executed by the one or more processors, cause the electronic device to perform operations comprising:
  presenting content based on a current transformation that defines a current positional relationship between a first coordinate system and a second coordinate system;
  obtaining an updated transformation that defines an updated positional relationship between the first coordinate system and the second coordinate system;
  determining a transformation correction based on the updated transformation and the current transformation; and
  applying a portion of the transformation correction based on movement of the electronic device, wherein the portion is less than all of the transformation correction.

12. The electronic device of claim 11, wherein to apply the portion of the transformation correction based on the movement of the electronic device, the instructions, when executed, cause the electronic device to perform operations comprising:
  determining a correction budget based on a velocity of the electronic device; and
  correcting only the portion of the correction corresponding to the correction budget in a plurality of subsequent frames displayed by the electronic device.

13. The electronic device of claim 11, wherein to apply the portion of the transformation correction based on the movement of the electronic device, the instructions, when executed, cause the electronic device to perform operations comprising:
  determining a rotation correction budget based on a rotation rate around a vertical axis of the electronic device; and
  correcting only a portion of the transformation correction corresponding to the rotation correction budget in a plurality of subsequent frames displayed by the electronic device.

14. The electronic device of claim 11, wherein the movement of the electronic device is between a first position determined at a time of the current positional relationship and a second position determined at a time of the updated positional relationship, further comprising:
  determining a second correction when the movement of the electronic device is above a threshold; and
  combining a portion of the second correction with the portion of the transformation correction, wherein the portion of the second correction is less than all of the of the second correction.

15. The electronic device of claim 11, wherein the instructions, when executed, cause the electronic device to perform operations comprising:
  obtaining pairs of first position data and second position data, the first position data corresponding to position of the electronic device in the first coordinate system obtained using a first technique and the second position data corresponding to position of the electronic device in the second coordinate system obtained using a second technique;
  determining transformations for the pairs, wherein each of the pairs is associated with a transformation that defines a position relationship between the first coordinate system and the second coordinate system based on the first position data and the second position data of a respective pair;
  identifying a subset of the pairs based on the transformations, a subset of the transformations corresponding to the subset of the pairs; and
  determining the updated transformation based on averaging the subset of the transformations.

16. The electronic device of claim 15, wherein the instructions, when executed, cause the electronic device to perform operations comprising:
  obtaining image data of a physical environment, wherein the first position data and the second position data are based on the image data of the physical environment.

17. The electronic device of claim 15, wherein the first position data is based on a predetermined image and depth data based 3D model of a physical environment in a global coordinate system, and wherein the second position data is based on a visual data and inertial data 3D model of the physical environment in a local coordinate system.

18. The electronic device of claim 11, wherein presenting the content comprises presenting virtual content indicators that provide directions, identify user selected positions, or guide a user of the electronic device along a path based on images of a physical environment.

19. A non-transitory computer-readable storage medium storing program instructions executable via one or more processors to perform operations comprising:
  presenting content on an electronic device based on a current transformation that defines a current positional relationship between a first coordinate system and a second coordinate system;
  obtaining an updated transformation that defines an updated positional relationship between the first coordinate system and the second coordinate system;
  determining a transformation correction based on the updated transformation and the current transformation; and
  applying a portion of the transformation correction based on movement of the electronic device, wherein the portion is less than all of the transformation correction.

20. The computer-readable storage medium of claim 19, wherein the instructions are further executable to perform operations comprising:
  obtaining pairs of first position data and second position data, the first position data corresponding to position of the electronic device in the first coordinate system obtained using a first technique and the second position data corresponding to position of the electronic device in the second coordinate system obtained using a second technique;
  determining transformations for the pairs, wherein each of the pairs is associated with a transformation that defines a position relationship between the first coordinate system and the second coordinate system based on the first position data and the second position data of a respective pair;
  identifying a subset of the pairs based on the transformations, a subset of the transformations corresponding to the subset of the pairs; and
  determining the updated transformation based on averaging the subset of the transformations.

* * * * *

UNITED STATES PATENT AND TRADEMARK OFFICE
CERTIFICATE OF CORRECTION

| | | |
|---|---|---|
| PATENT NO. | : 12,062,211 B1 | |
| APPLICATION NO. | : 18/114203 | |
| DATED | : August 13, 2024 | |
| INVENTOR(S) | : Christian Lipski and David A. McLaren | |

It is certified that error appears in the above-identified patent and that said Letters Patent is hereby corrected as shown below:

On the Title Page

ABSTRACT, Item (57), Line 2, reads:
"...systems, and methods that tracks an electronic device by..."

Should read:
--...systems, and methods that track an electronic device by...--

Signed and Sealed this
Tenth Day of September, 2024

Katherine Kelly Vidal
*Director of the United States Patent and Trademark Office*